(12) United States Patent
Båvhammar et al.

(10) Patent No.: US 9,511,435 B2
(45) Date of Patent: Dec. 6, 2016

(54) METHOD AND A DEVICE FOR BRAZING

(75) Inventors: Torsten Båvhammar, Staffanstorp (SE); Johan Båvhammar, Staffanstorp (SE); Bo Svensson, Åkarp (SE)

(73) Assignee: Safetrack Infrasystems SISAB AB (SE)

( * ) Notice: Subject to any disclaimer, the term of this patent is extended or adjusted under 35 U.S.C. 154(b) by 321 days.

(21) Appl. No.: 13/497,404

(22) PCT Filed: Sep. 22, 2010

(86) PCT No.: PCT/SE2010/051020
§ 371 (c)(1),
(2), (4) Date: Apr. 19, 2012

(87) PCT Pub. No.: WO2011/037529
PCT Pub. Date: Mar. 31, 2011

(65) Prior Publication Data
US 2012/0312789 A1   Dec. 13, 2012

(30) Foreign Application Priority Data

Sep. 22, 2009 (SE) ...................... 0950691

(51) Int. Cl.
| B23K 1/00 | (2006.01) |
| B23K 3/03 | (2006.01) |
| B23K 3/047 | (2006.01) |

(52) U.S. Cl.
CPC .............. *B23K 1/00* (2013.01); *B23K 3/0323* (2013.01); *B23K 3/0384* (2013.01); *B23K 3/0478* (2013.01); *B23K 2201/26* (2013.01)

(58) Field of Classification Search
CPC .... H05K 3/3494; B23K 1/0004; B23K 3/0475
(Continued)

(56) References Cited

U.S. PATENT DOCUMENTS 5,191,302 A * 3/1993 Rossnick ................... 331/109
5,313,045 A * 5/1994 Baavhammar ............. 219/129
(Continued)

FOREIGN PATENT DOCUMENTS

RU   2131338 C1   6/1999
RU   2224628 C1   2/2004

OTHER PUBLICATIONS

"PCT International Search Report dated Feb. 2, 2011 for PCT/SE2010/051020, from which the instant application is based," 3 pgs.
(Continued)

*Primary Examiner* — Dana Ross
*Assistant Examiner* — Kuangyue Chen
(74) *Attorney, Agent, or Firm* — Fredrikson & Byron, P.A

(57) ABSTRACT

A method for controlling a brazing process, including the steps of applying a welding current through an electrode (52) pressed to a metal surface (83) of a workpiece to form a welding arc. Further steps are continuously measuring the welding current and the welding time, continuously determining supplied energy on the basis of the welding current and the welding time, digitally switching current supplied from batteries of a DC source (10) and to maintain a substantially constant welding current, interrupting the supply of welding current when a predetermined amount of energy has been supplied and supplying heat to batteries when a temperature of the batteries is below a predetermined value. The apparatus comprises a control module (31) with a central unit (26) and a power control unit (28) wherein the central unit (26) and the control unit (28) are operatively connected for continuously measuring the welding current, a switched circuit module (12) producing a substantially constant welding current of a predetermined value and a first temperature transducer (36) provided in the vicinity of batteries included in the DC source (10). A heat transfer means (34; 70) is activated when the temperature of the batteries is below a predetermined value.

9 Claims, 3 Drawing Sheets

(58) Field of Classification Search
USPC ..... 219/85.18, 85.22, 130.32, 137 PS, 137 R
See application file for complete search history.

(56) References Cited

U.S. PATENT DOCUMENTS

| | | | | |
|---|---|---|---|---|
| 5,710,507 | A | * | 1/1998 | Rosenbluth et al. ............ 307/66 |
| 5,795,664 | A | * | 8/1998 | Kelly ................................ 429/7 |
| 5,895,728 | A | * | 4/1999 | Walker et al. ................... 429/53 |
| 5,968,385 | A | * | 10/1999 | Beeson et al. ........... 219/130.33 |
| 6,899,261 | B2 | | 5/2005 | Pettersen |
| 7,312,419 | B2 | * | 12/2007 | Beeson et al. ................ 219/133 |

OTHER PUBLICATIONS

Office Action for corresponding Russian Application No. 2012114239/02(021534), with English translation, 9 pgs.

\* cited by examiner

METHOD AND A DEVICE FOR BRAZING

RELATED APPLICATIONS

This application is a 35 U.S.C. 371 national stage filing from International Application No. PCT/SE2010/051020 filed Sep. 22, 2010, claiming priority to Swedish Application No. 0950691-6 filed Sep. 22, 2009, the teachings of which are incorporated herein by reference.

TECHNICAL FIELD

The invention relates to a method for controlling a brazing process, including applying a welding current through an electrode pressed to a metal surface of a work piece and separating the electrode from the metal surface to form a welding arc. Pin brazing using a brazing pin as an electrode can be used in various embodiments. Brazing can be used for electrically connecting a wire to a metallic object such as a rail more generally for providing an electric connection between two electrically conducting objects. It is very common that the brazing process is carried out with mobile units comprising a battery power source.

PRIOR ART

A special brazing pin with a metal solder (melting temperature is less than 700° C.) is melt down in a hole of a cable lug and creates a brazed connection between the cable lug and the metal construction, for instance a railway track or a pipeline. A low resistance metal, such as silver can be used. Silver is a very good electrical conductor and will provide an extremely low transition resistance. Normally a pinbrazing gun connected to a power supply is used to melt a brazing pin including a solder material.

One problem with using the conventional methods on railway tracks is that the strong heat released under the brazing site causes a proportionately strong martensite formation, which in turn can result in crack formations. Another problem is related to the battery power source that is normally used for the brazing process and concerns the intensity of the current that is supplied from the power source. Due to varying conditions during brazing the intensity of the current will vary and cause irregularities and inconsistencies in the electrical connection.

A further problem is related to the battery capacity in general and during varying temperature conditions specifically. Normally, pin brazing will be effected outdoors and the temperature may vary from −30° C. to above +50° C. High power battery cells now available are capable of providing sufficient amperages at normal temperatures but suffer from a lower capacity at very low temperatures.

SUMMARY OF THE INVENTION

It is an object of the present invention to provide a battery powered brazing system that provides predictable results during varying conditions. A novel control method will ensure that a consistent current intensity is supplied. In one embodiment batteries of a DC source included in the system are insulated and maintained at an appropriate operating temperature. Means are provided also for maintaining an appropriate temperature during charging of the batteries. The brazing system in accordance with the invention is generally well suited for different types of electrodes and very well suited to be used as a pin brazing system where a pin is used as an electrode.

Current from the DC source is switched by digital components and is continuously measured. The digital components are controlled to maintain substantially constant amperage even during varying operating conditions. Also the duration of the supply of current is kept at a constant value. By controlling the amperage as well as the time period of the supply of current the quality of the brazing process can be ensured. Also the level of the supplied energy will be constant during the brazing process.

In one embodiment the DC source comprises a plurality of rechargeable cells that are organized in groups of cells connected in parallel and in series. The cells are arranged on a heat emitting sheet in a cabinet. Preferably the cabinet is heat insulated. At least one temperature transducer is provided in the vicinity of the cells to obtain temperature data. A control unit continuously monitors the cell temperature and controls supply of power to the heat emitting sheet whenever the temperature falls below a preferred operating temperature of the cells.

The heat emitting sheet also will assist in transferring heat from the cells when the temperature is raised during intensive discharge sequences. Heat dissipation from the cells through the heat emitting sheet is further improved in embodiments where the cabinet is made of metal.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
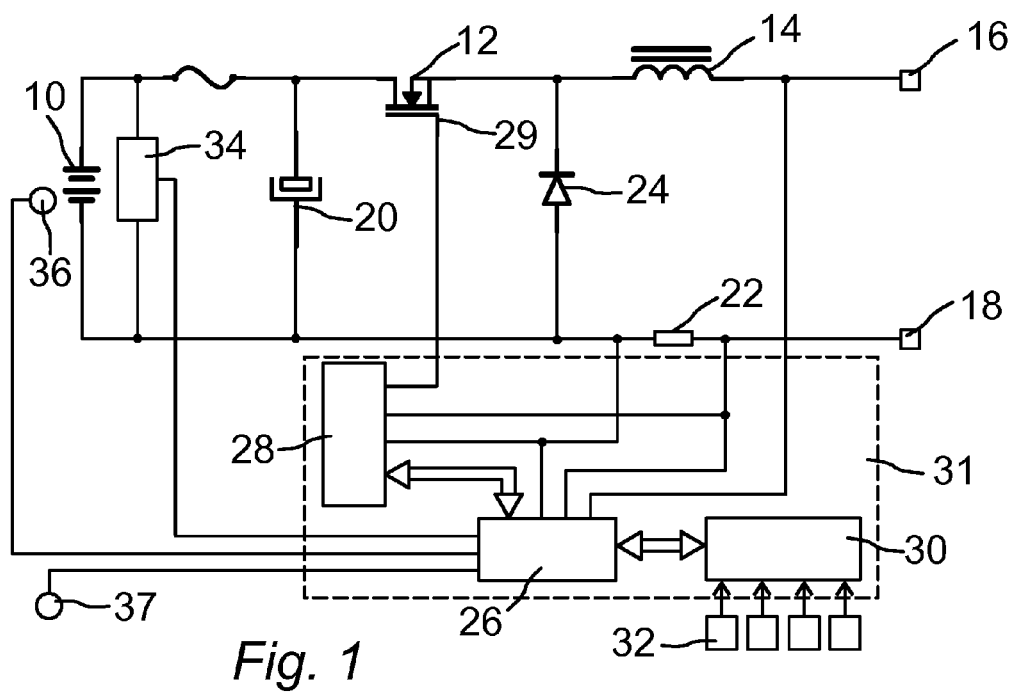
FIG. 1 schematically shows a circuit diagram of a basic embodiment in accordance with the invention.

The schematic diagram in FIG. 1 illustrates one embodiment of basic electronic and electric components that can be used in a device in accordance with the invention. It should be noted that all single components shown in FIG. 1 are to be considered as basic functional elements that can be replaced with circuits or completing components providing the same or corresponding functions.

Required power for the operation of the pin brazing gun and pin brazing process is supplied from an array of battery cells 10. Current from the cells is directed to a switched circuit module 12. Commercially available switching components, such as power MOSFET transistors, can be used. A switching frequency of about 30 kHz is normally used. The switched circuit module 12 will output current at a very high level to render the pin brazing possible.

An output inductor 14 is connected between the switched circuit module 12 and a first output 16 of the device. A second output 18 normally is connected to ground. A capacitor 20 is connected in parallel with the battery cells 10 for stabilization purposes.

A shunt resistor 22 is connected in series with the battery cells 10. In the shown embodiment the shunt resistor 22 is connected at the second output 18. All current supplied to the pin brazing process will pass through the shunt resistor 22 and by measuring the voltage over the shunt resistor 22 having a known and well defined value the actual supplied current can be determined. A diode 24 is connected between the shunt resistor 22 and the output inductor 14. The output inductor 14 and the diode 24 will contribute to a well defined and even output current.

A central unit 26 is connected to measure the output current. In the shown embodiment a signal indicative of the output current is obtained by measuring the voltage over the shunt resistor 22. Two input lines of the central unit 26 are connected one on either side of the shunt resistor. Also the output voltage measured at the first output 16 is transferred to the central unit 26 through a further input line.

The switched circuit module 12 is controlled and driven by a power control unit 28 through a control line connected between an output of the control unit 28 and a control input 29 of the switched circuit module 12. The control unit 28 has two further control inputs that are connected to obtain a value representative of the output current. In the shown embodiment the two further control inputs are connected over the shunt resistor 22. In other embodiments the power control unit 28 and the central unit 26 measure the output current using other current measuring techniques.

The power control unit 28 provides pulse width modulation signals to the switched circuit module 12, so as to maintain a predetermined current output of the switched circuit module 12. The power control unit 28 further is connected to the central unit 26 for receiving instructions and for exchanging data and connected also to an input-output device 30. The input-output device 30 is connected to a plurality of switches and buttons 32 that are used for adjustment and setting up purposes. The power control unit 28, the central unit 26 and the input-output device 30 can be arranged in a control module 31.

In various embodiments the battery cells 10 are arranged on a heat emitting sheet 34 that will provide a suitable operating temperature for the cells also during low temperature conditions. The heat emitting sheet is controlled by the central unit on the basis of a first temperature transducer 36 arranged in the vicinity of the battery cells. A second temperature transducer 37 also is arranged in the vicinity of the battery cells for providing a charger with relevant temperature information when the battery cells are charged. The first temperature transducer 36 and the second temperature transducer 37 are operatively connected to the central unit 26.

Figure 2:
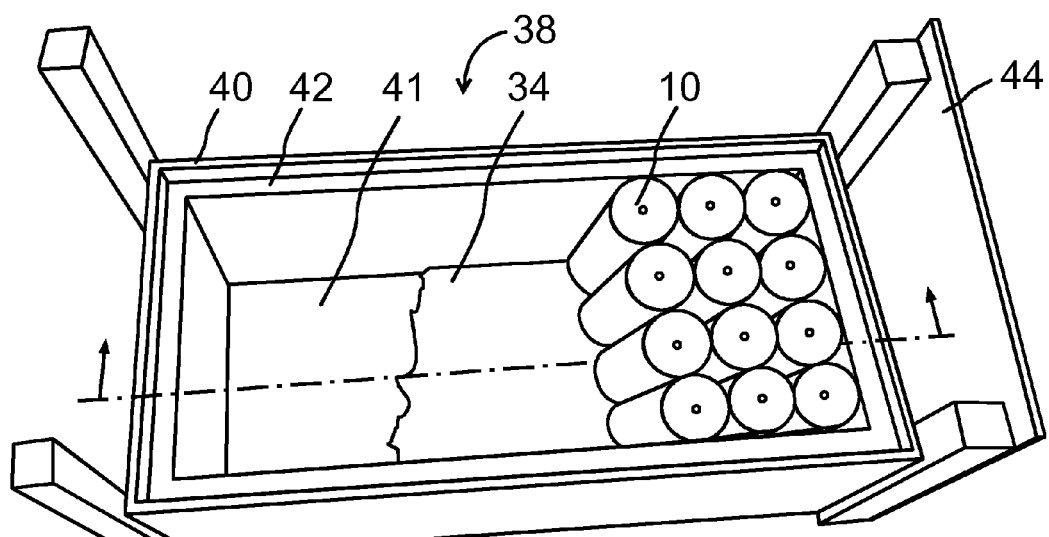
FIG. 2 is a perspective view from above of a cabinet as part of one practical embodiment of the invention.
Figure 3:
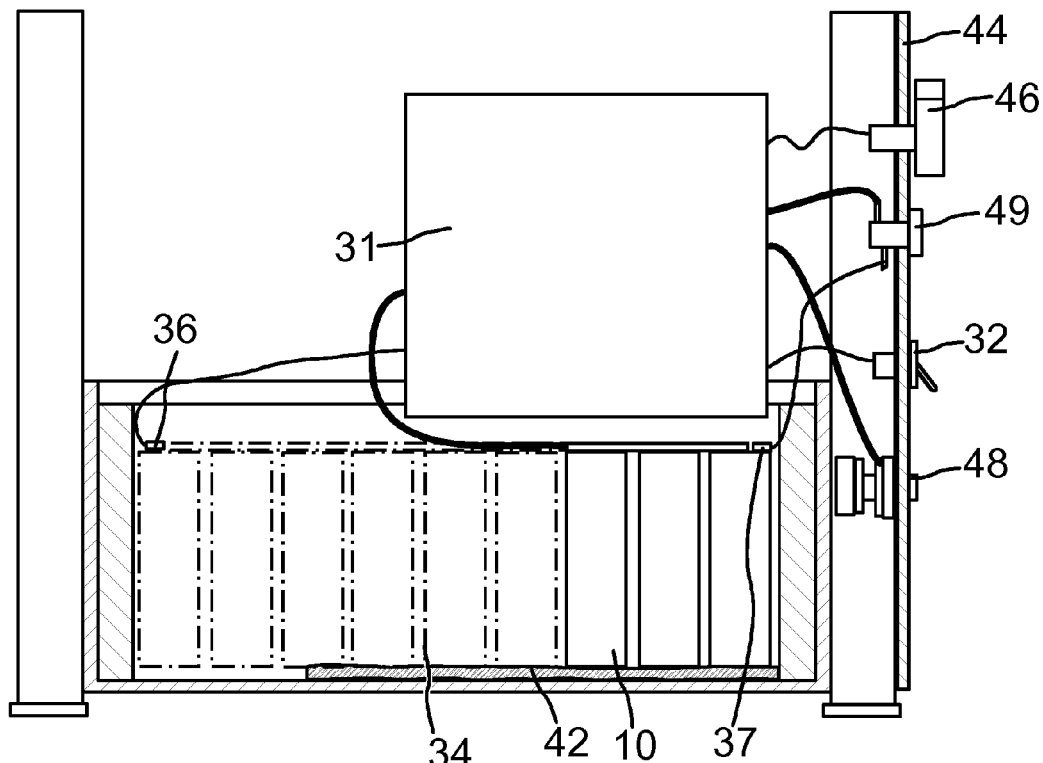
FIG. 3 is a partly sectioned side elevation view of a cabinet as part of one practical embodiment of the invention.

A basic embodiment of a cabinet 38 is shown in FIG. 2. The cabinet 38 is formed like box with a rectangular cross section and with side walls 40 and a bottom 41. All inside sections of the walls 40 are covered with a heat insulation layer 42. A heat emitting sheet 34 is arranged on the bottom 41 and covers it completely in the shown embodiment. In various embodiments heat emitting sheets similar to the heat emitting sheet used in the bottom 41 are provided on some or all of the heat insulation layers covering the walls. The heat emitting sheet 34 forms a supporting pad for the battery cells 10. A front panel 44 supports current terminals, switches and similar devices, c.f. FIG. 3 and description below.

FIG. 3 illustrates the arrangement with the battery cells 10 and the heat emitting sheet 34. For normal conditions the heat emitting sheet will transfer heat from the separate battery cells due to high power dissipation from the battery cells. If the first temperature transducer 36 senses a temperature below a predetermined value the control module will ensure that power is supplied to the heat emitting sheet 34 until a desired temperature close to the battery cells is achieved. If the temperature as sensed by the first temperature transducer 36 falls outside a predetermined interval, related to the preferred operating conditions of the battery cells, the control module 31 disables further brazing processes until the temperature again is within said interval.

One set of battery cells is shown only. In one embodiment thirty-six cells altogether are used. The cells are connected in parallel and in series so as to be able to output appropriate levels of current and power. Switches 46, buttons 32 and terminals 48 are provided on the front panel 44 and connected to the control module 31. The second temperature transducer 37 is connected to a charging terminal 49 where a charger can be connected for charging the battery cells. The control module 31 is arranged above the battery cells 10. A cover (not shown) can be arranged in a conventional manner.

When the charger is connected through the charging terminal 49 an actual temperature value as obtained by the second temperature transducer 37 is transferred to the charger. If the temperature value does not fall within a predetermined temperature interval no charging process will take place.

Figure 4:
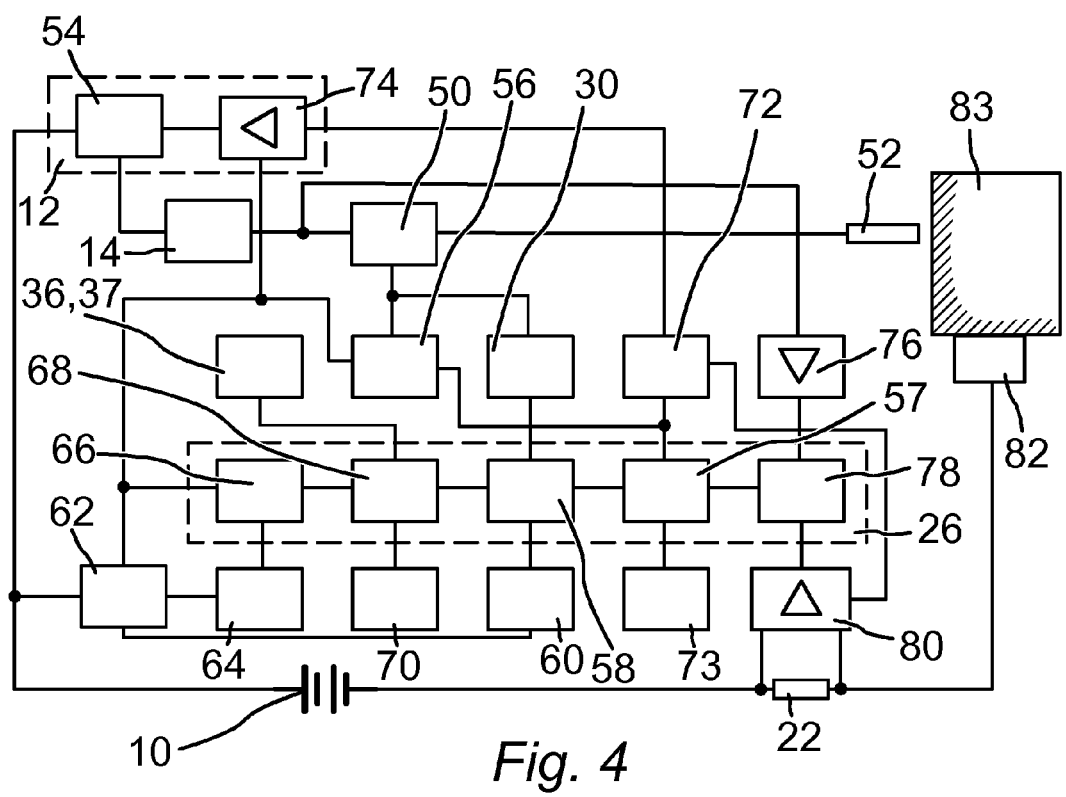
FIG. 4 is a block diagram of one embodiment of a device in accordance with the invention.

The block diagram shown in FIG. 4 comprises different logical or functional blocks that can be implemented in separate circuits or as a combination of hardware components and software functions. Main modules are a pin brazing gun 50 with a pin 52. The pin brazing gun 50 is connected to a power unit 54 for the supply of power and to a gun control unit 56. The gun control unit 56 is connected to a brazing control unit 57 forming one section of the central unit 26. The power unit 54 may include the capacitor 20 and the diode 24. The pin brazing gun 50 comprises electric, hydraulic or pneumatic means for advancing the brazing pin 52 automatically toward a work piece surface 83 during pin brazing to maintain a substantially constant distance between the brazing pin 52 and the work piece surface 83 while the welding current is being applied.

The input-output device 30 is connected a timing and input-output section 58 of the central unit 26. The input-output section 58 is operatively connected to a timer 60. The timer 60 is used as to control a converter module 62 being arranged for converting the available battery voltage of the battery cells to operating voltages to electronic circuits and to the gun control unit 56. A voltage reference circuit 64 provides reference voltages to the converter module 62 and is also connected to a starter control circuit 66, said starter control circuit 66 being a part of the control module 31. The timer 60 also will measure an inactivity time period without pin brazing activity. If the inactivity time period exceeds a predetermined set time period, such as 20 minutes, the all power consuming components are turned off.

The control module 31 also comprises a system control unit 68 which is connected to external temperature transducers 36, 37. Depending on the temperature of the temperature transducers the system control unit 68 controls a heating and cooling means 70 that is thermally connected to the battery cells 10. The heating and cooling means 70 comprises the heat emitting sheet 34.

The brazing control unit 57 is connected to a pulse width modulator circuit 72 and to a brazing timer 73. A power modulation signal is transferred from the pulse width modulator circuit 72 to the power unit 54 through a driver 74 that provides a sufficient amplification of the modulation signal. The power unit is connected to the pin brazing gun 50 and to a first level control unit 76. The first level control unit 76 transforms a brazing voltage from the power unit 54 to a level suitable for a voltage and current input unit 78 of the control module 31.

The voltage and current input unit 78 also is connected to a second level control unit 80 that supplies a measured value indicative of the actual brazing current. In the shown embodiment the brazing current value is obtained as a voltage across a shunt resistor 22. The pin brazing gun 50 receives and carries a pin 52 in a conventional manner. A grounding device 82 that is attached to a metal surface 83 where a connection is to be provided completes a closed circuit to the pin 52. In one embodiment the grounding device 82 comprises a ground magnet.

Figure 5:
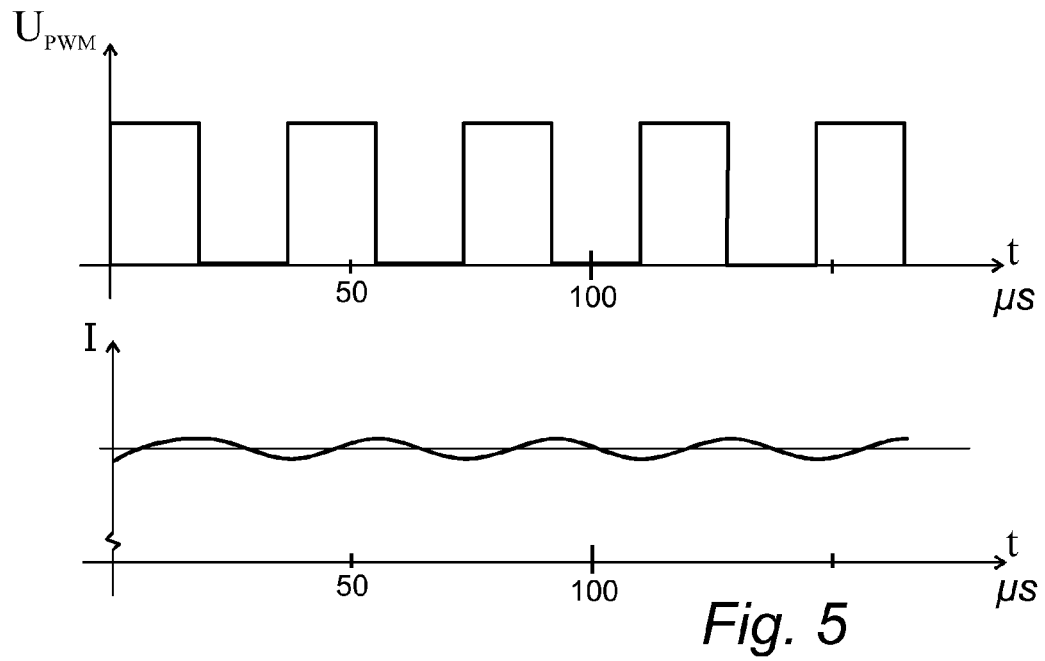
FIG. 5 shows graphs of output signals from a pulse width modulation circuit above and a resulting output current below and FIG. 6 is a schematic graph showing actual current as a function of time in one pin brazing process.

The top graph in FIG. 5 schematically illustrates an output voltage signal $U_{PWM}$ from the pulse width modulator circuit 72. This signal is further amplified in the driver 74 and is then fed to the power unit 54 supplying power to the gun 50. The power unit 54 comprises the switched circuit module 12, the capacitor 20, diodes 24 and the output inductor, c.f. FIG. 1. The bottom graph in FIG. 5 schematically illustrates an output current signal that is supplied to the gun 50 and the pin 52. The oscillations of the output current shown in FIG. 5 are only minor and the output current is maintained at a substantially constant value during the brazing process.

Figure 6:
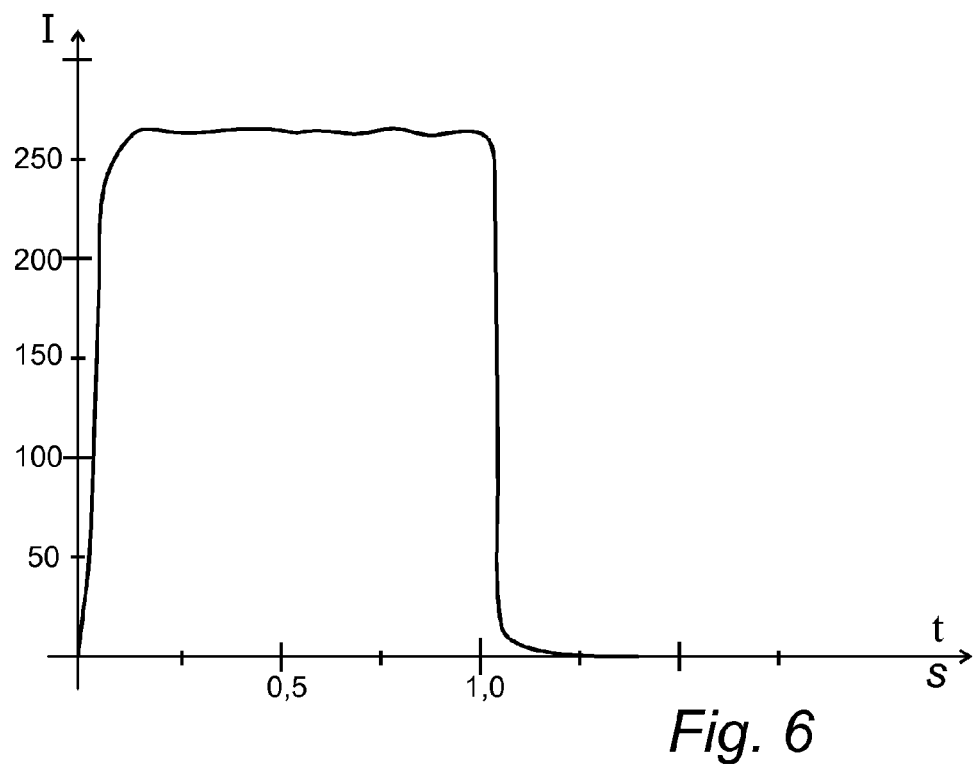

The frequency of the output voltage signal is approximately 30 kHz resulting in a period of approximately 33 µs. As a result of the diode 24 and the output inductor 14 (c.f. FIG. 1) the output current will be equalized. The output current remains at a substantially constant level throughout each pin brazing process as shown in FIG. 6.

A pin brazing process will last for approximately 1 second or slightly longer. As shown in FIG. 6 the current that is actually used in the process will rise very fast to a predetermined level which in the shown embodiment is approximately 260 A and will remain at this level for a predetermined time period. The length of the pin brazing period corresponds to the required energy and is determined by different factors such as size, volume and material of the pin. The current value is easily adjusted by the control unit 57 and the pulse width modulator circuit 72. Brazing with a carbon electrode normally requires supply of more energy.

Also by normal usage of a pin brazing gun the means for advancing the brazing pin may require occasional adjustments so as to ensure that the distance between the brazing pin and the work piece surface is maintained substantially constant. A shorter distance may in prior art devices result in shorter pin brazing time periods and some uncertainty of the quality. Should the distance exceed a preferred value the pin brazing process may be interrupted too soon.

This results are completely avoided in accordance with the invention because the current level as well as the pin brazing time period are kept at predetermined and adjustable magnitudes essentially independently of the actual distance. Also the total energy used during the pin brazing process is kept constant.

The invention claimed is:

1. A method for controlling a brazing process, including the steps of applying a brazing current through an electrode pressed to a metal surface of a workpiece, and separating the electrode from the metal surface to form a welding arc, characterized by:
   continuously measuring the brazing current and time for brazing;
   continuously determining supplied energy on the basis of the brazing current and the brazing time;
   maintaining the brazing current to be substantially constant for the entire duration of the brazing process via digital switching of current supplied from a DC source, wherein a control structure is used comprising a power control unit and a switched circuit module connected to the DC source, the power control unit using measured value of the brazing current as an input and outputting pulse width modulation signals to the switched circuit module to maintain a predetermined current output of the switched circuit module and to correspondingly keep the brazing current substantially constant; and
   interrupting supply of the brazing current when a predetermined amount of energy has been supplied.

2. The method of claim 1, further comprising the steps of:
   obtaining a first temperature value indicative of temperature of batteries included in the DC source so as to maintain an operative temperature of the batteries and to provide a required brazing current;
   determining the temperature of the batteries in relation to a predetermined temperature interval; and
   continuing or disabling brazing processes based on results of the determining step, wherein, when the temperature of the batteries is determined to be outside the predetermined temperature interval, the brazing processes are disabled, heat is supplied to the batteries, and the temperature is continuously determined until the temperature of the batteries is again within the predetermined temperature interval, whereat the brazing processes are again enabled.

3. The method of claim 1, wherein the brazing process is a pin brazing process, the method also including the step of mechanically advancing a brazing pin automatically toward a work piece surface during pin brazing to maintain a substantially constant distance between the brazing pin and the work piece surface while the brazing current is being applied.

4. The method of claim 1, also including the steps of:
   continuously measuring a stop time period after finalizing one brazing process; and
   turning off main power consumption when the stop time period exceeds a predetermined time period.

5. The method of claim 2, also including the step of disabling charging of the batteries when the temperature of the batteries is outside the predetermined temperature interval.

6. The method of claim 1, wherein the switched circuit module is part of a power unit that further comprises a diode and an inductor, each connected to the switched circuit module and opposing ends of output for the brazing current.

7. The method of claim 1, wherein the switched circuit module is a power MOSFET transistor.

8. The method of claim 1, further comprising a width modulator circuit connected to the power control unit and a driver connected between the width modulator circuit and the switched circuit module to amplify the pulse width modulation signals.

9. The method of claim 1, wherein load as seen from the DC source is resistive.

\* \* \* \* \*